United States Patent [19]
Jeffery et al.

[11] Patent Number: 5,417,077
[45] Date of Patent: May 23, 1995

[54] LEAVING AIR TEMPERATURE CONTROL OF COOLING SYSTEM

[75] Inventors: Harold L. Jeffery, Ft. Wayne, Ind.; Harrison T. Hickenlooper, III, Palatka, Fla.

[73] Assignee: Carrier Corporation, Syracuse, N.Y.

[21] Appl. No.: 206,567

[22] Filed: Mar. 4, 1994

[51] Int. Cl.⁶ .......................... F25D 17/00; F24F 7/00
[52] U.S. Cl. ...................................... 62/180; 236/49.3
[58] Field of Search ....................... 236/49.3; 165/122; 62/180

[56] References Cited

U.S. PATENT DOCUMENTS

| | | | |
|---|---|---|---|
| 3,788,386 | 1/1974 | Demaray | 165/2 |
| 4,272,966 | 6/1981 | Niemann et al. | 62/180 |
| 4,406,397 | 9/1983 | Kamata et al. | 236/1 B |
| 4,716,957 | 1/1988 | Thompson et al. | 165/12 |
| 4,754,919 | 7/1988 | Otsuka et al. | 236/49 |
| 4,830,095 | 5/1989 | Friend | 165/22 |
| 4,928,750 | 5/1990 | Nurczyk | 165/2 |
| 5,025,638 | 6/1991 | Yamagishi et al. | 62/180 |
| 5,076,346 | 12/1991 | Otsuka | 165/22 |
| 5,305,953 | 4/1994 | Rayburn et al. | 236/49.3 |

*Primary Examiner*—William E. Wayner

[57] ABSTRACT

The temperature of air leaving a cooling coil is monitored for dropping below various threshold values. The number of cooling stages which chill the refrigerant flowing through the cooling coil is first reduced when the temperature drops below a first threshold and continues to drop relative to a previously sensed temperature. Damper positions governing the amount of air flowing to zones to be cooled are thereafter adjusted when the temperature continues to drop relative to a previously sensed temperature. All adjusted positions are at least maintained relative to a calculated offset value until the temperature rises above a second threshold value greater than the first threshold value. All cooling stages are turned off if the sensed temperature drops below a third threshold value lower than the first threshold.

16 Claims, 5 Drawing Sheets

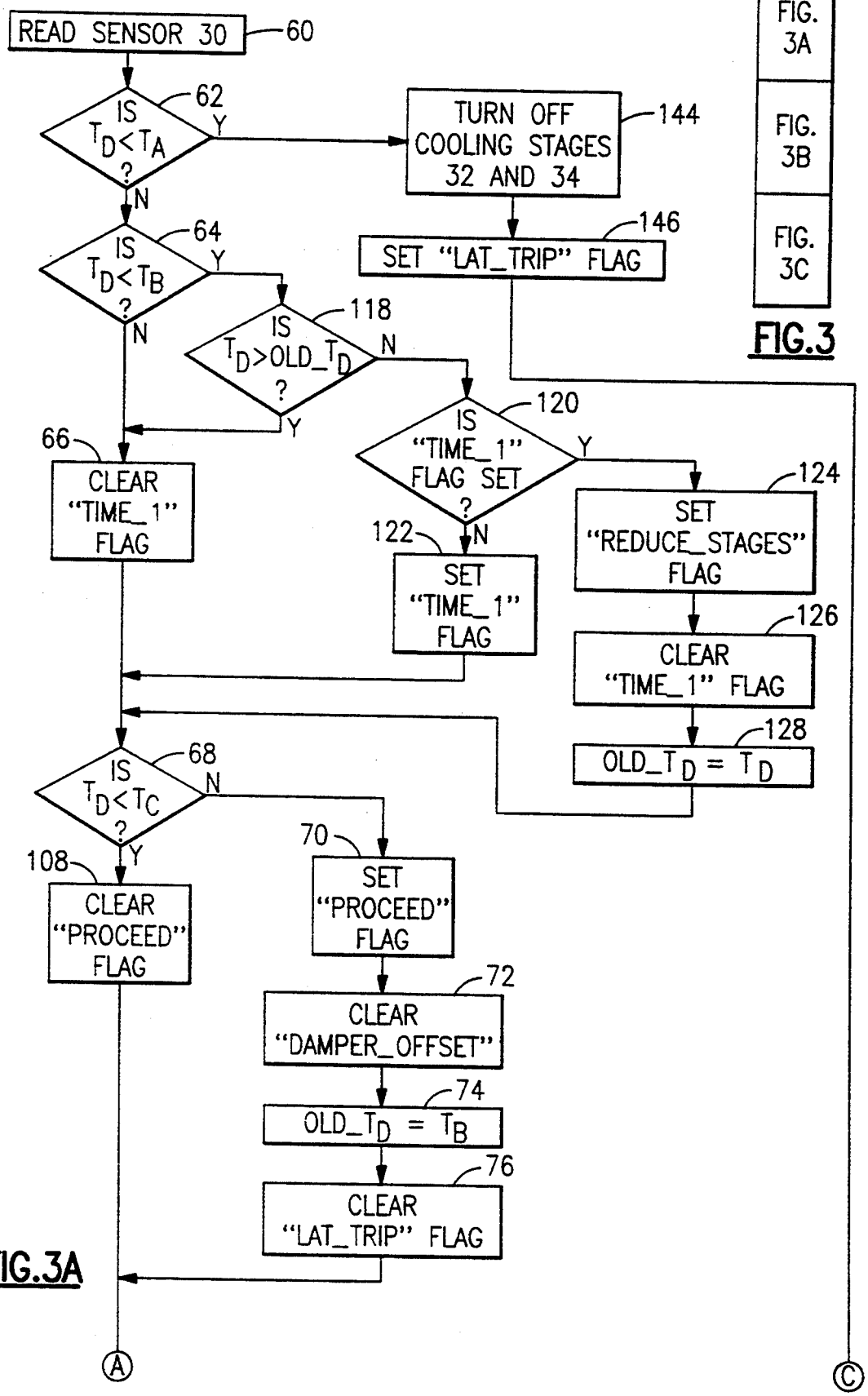

5,417,077

LEAVING AIR TEMPERATURE CONTROL OF COOLING SYSTEM

FIELD OF THE INVENTION

This invention relates to the control of a variable air volume system having a source for cooling the air and a plurality of individual dampers which govern the flow of the air to individual zones that are to be cooled. In particular this invention relates to the control of the cooling source and the individual dampers when the temperature of the air leaving the cooling source drops below permissible levels.

Variable air volume systems having a cooling source which provides chilled air to individual zones in a home or office building via controlled dampers are well known in the art. The dampers in such systems are opened or closed in response to temperature conditions in each zone. In this regard, the damper for a given zone is typically moved to a more closed position when the temperature of the zone approaches the set point temperature for the zone. There may be times when most of the zones have reached their respective set point temperatures while demand is still being placed on the central source to provide chilled air to perhaps only a few zones. In this situation, the central source which usually includes at least one cooling coil for chilling the forced air passing over it may experience a significant drop in temperature in the air passing over it. This may lead to a frosting of the cooling coil in the central cooling source.

OBJECTS OF THE INVENTION

It is an object of the invention to provide a variable air volume system for cooling multiple zones with a process for protecting the cooling coil when the air passing over the cooling coil drops below permissible levels.

SUMMARY OF THE INVENTION

The above and other objects are achieved by a process which controls a plurality of dampers governing the flow of air to individual zones that are to be cooled by a cooling source having possibly two or more cooling stages associated with a cooling coil. The process resides in a programmed microprocessor which monitors the temperature of the air leaving the cooling coil. The monitored temperature is compared with up to three separate temperature threshold values. The highest threshold temperature allows the variable air volume system to operate in a normal fashion when the temperature of the air that has passed over the cooling coil exceeds this value. The middle threshold temperature is an alert that the temperature of the air that has passed over the cooling coil has reached a level where the number of cooling stages should be reduced to preferably one stage of cooling. All dampers in the variable air volume system are thereafter opened by at least a defined amount so as to alleviate the flow of air over the cooling coil. When pursuing this course of action, the control process first deactivates the additional cooling stage or stages and thereafter begins to define ever increasing amounts of opened damper position for each damper. Damper positions are continuously increased as long as the leaving air temperature remains below the middle threshold value and moreover continues to decrease each time it is sensed and compared with a previously noted value of air temperature. The thus opened dampers cannot be closed until the temperature of the air that has passed over the cooling coil rises above the highest threshold value. Any demand for reactivation of the additional cooling stages is also not permitted until the highest threshold value is exceeded.

The lowest temperature is an alert that the temperature of the air that has passed over the cooling coil has not been corrected by the deactivation of the second cooling stage and the opening of the dampers. In this event, the remaining active cooling stage is deactivated. Neither stage of cooling may be reactivated until the temperature of the air that has passed over the cooling coil exceeds the highest threshold value.

BRIEF DESCRIPTION OF THE DRAWINGS

Other objects and advantages of the present invention will be apparent from the following description in conjunction with the accompanying drawings in which.

DESCRIPTION OF THE PREFERRED EMBODIMENT

Figure 1:
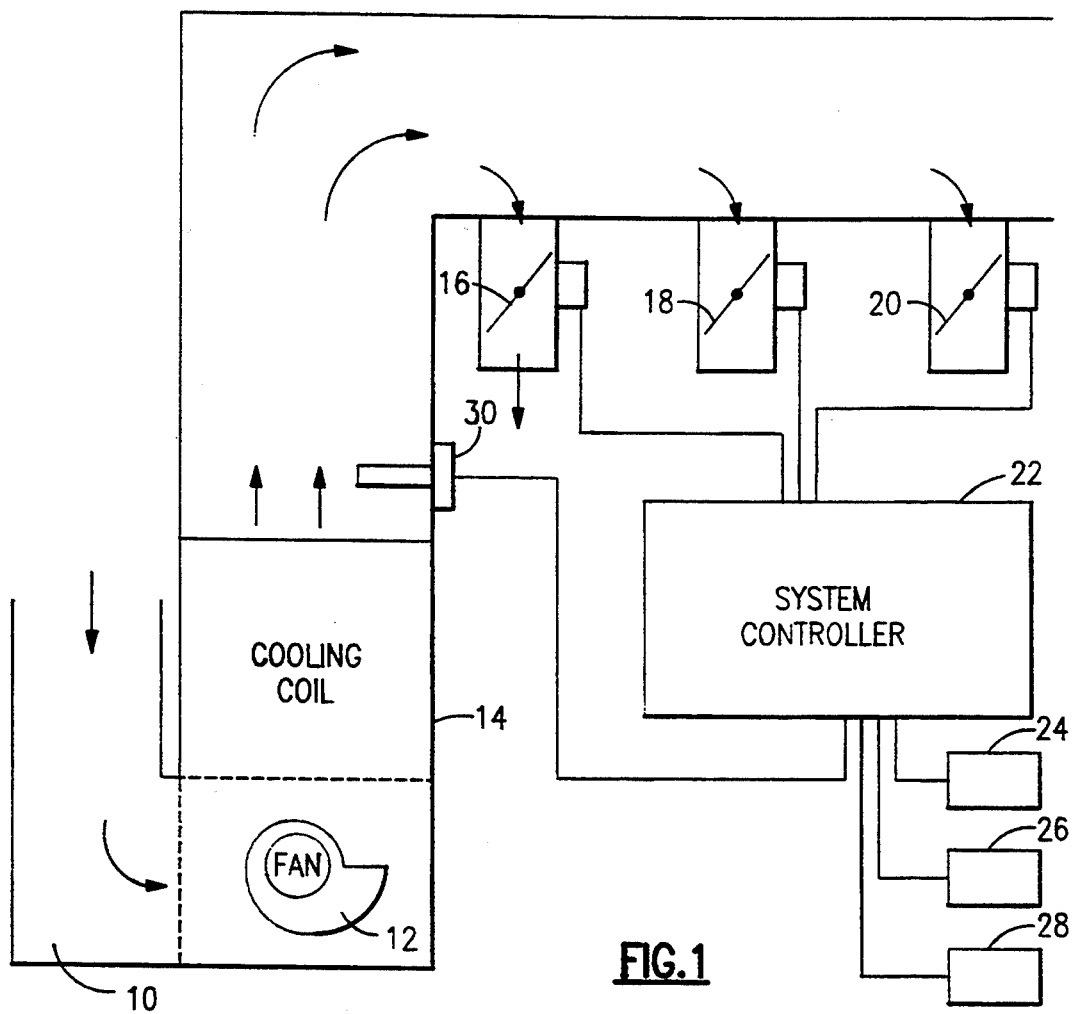
FIG. 1 is an overall diagram of a variable air volume system having a plurality of separate dampers providing chilled air to various zones controlled by a single system controller.

Referring to FIG. 1, returning air from various temperature control zones is drawn into a return duct 10 by a fan 12 for subsequent flow over a cooling coil 14. The chilled air is thereafter provided to a number of temperature control zones via dampers 16, 18, and 20.

These dampers are controlled by a system controller 22 which receives temperature readings from each zone via remote temperature sensors 24, 26, and 28. The system controller 22 also receives a temperature reading of the chilled air leaving the cooling coil 14 via a temperature sensor 30.

Figure 2:
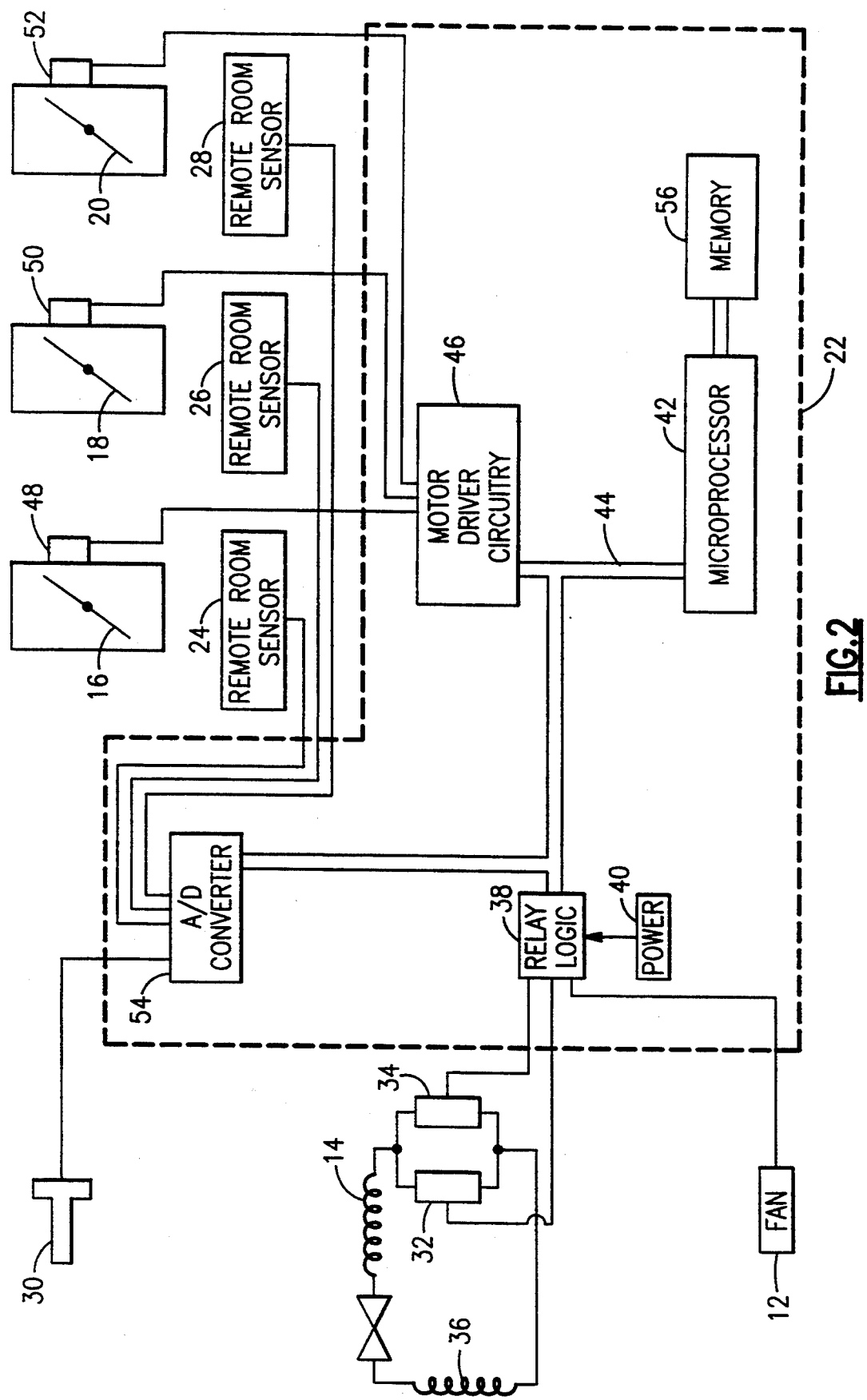
FIG. 2 is a more detailed diagram of the system controller which is seen to include a programmed microprocessor which controls both a two stage cooling system as well as the dampers of FIG. 1.

Referring now to FIG. 2, various elements of a two stage cooling system associated with the cooling coil 14 are illustrated relative to control elements of the system controller 22. In particular, the cooling coil 14 is seen to include two stages of cooling 32 and 34 which chill refrigerant which subsequently passes through the cooling coil 14 before returning to the cooling stages via a condensing coil 36. The two stages of cooling 32 and 34 are activated by relay logic 38 receiving appropriate voltage signals from a power source 40. The relay logic 38 causes the various voltage levels to be applied to the respective stages of cooling 32 and 34 in response to control signals from a microprocessor 42 received via a communication bus 44. The microprocessor 42 also controls the relay logic 38 so as to provide appropriate voltage activation signals to the fan 12.

The microprocessor 42 also communicates with motor drive circuitry 46 via the communication bus 44. The motor drive circuitry interfaces with damper motors 48, 50 and 52 that position the dampers 16, 18, and 20. The microprocessor 42 also communicates with an A/D converter 54 which receives temperature signals from the remote room sensors 24, 26, and 28 as well as the temperature sensor 30 downstream of the cooling coil 14.

Figure 3B:
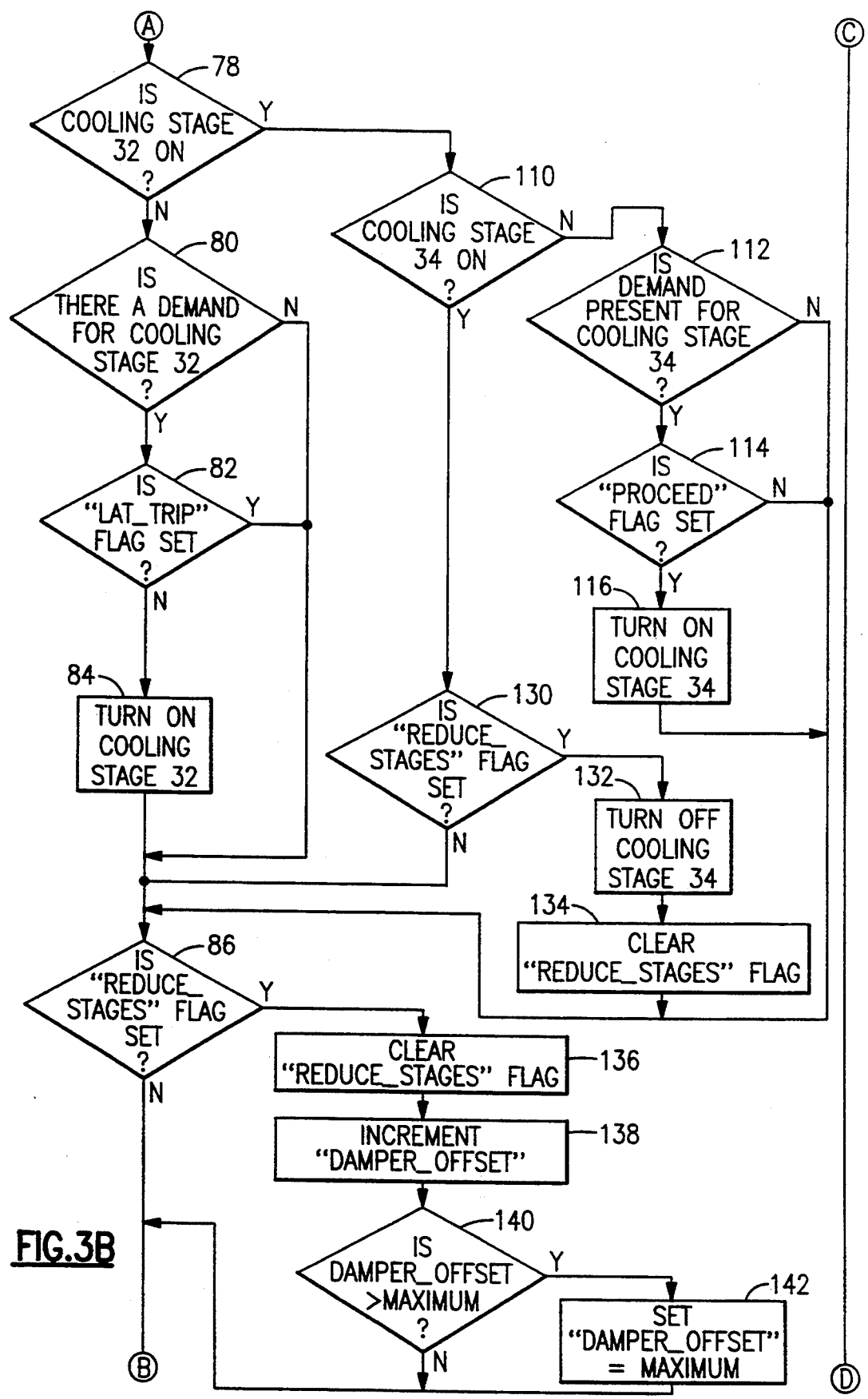
FIG. 3 shows the overall relationship between FIG. 3A-3C FIGS. 3A-3C illustrate a process executed by the microprocessor for controlling the variable air volume system of FIG. 1 so as to avoid potentially frosting the cooling coil associated with the two stage cooling system.
Figure 3C:
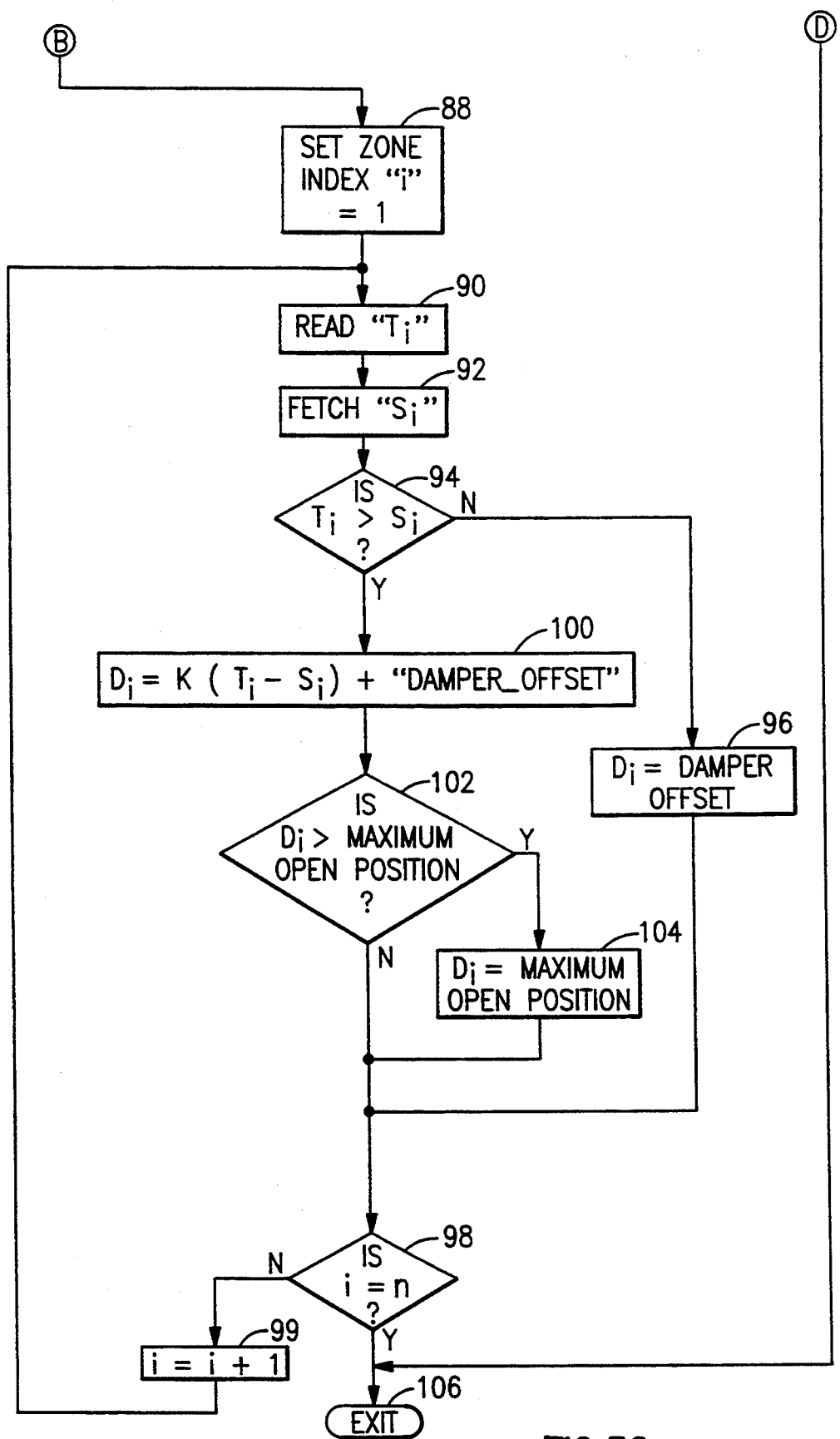

The microprocessor 42 executes various control processes stored in a memory 56 associated therewith. One such stored process monitors the temperature sensed by the temperature sensor 30 and provides appropriate control signals over the bus 44 to either the relay logic 38, or the motor driver circuitry 46 so as to thereby control the two stages of compression 32 and 34 as well as the dampers 16, 18, and 20. This stored process executable by the microprocessor 42 is illustrated in FIGS. 3A, 3B, and 3C.

Referring to FIG. 3A, the stored process begins with a step 60 wherein the duct temperature $T_D$ is read from the sensor 30. It is to be appreciated that the duct temperature $T_D$ is a reading of the temperature of the air leaving the cooling coil 14. As will be explained in detail hereinafter, this sensed temperature will be compared with three separate threshold temperature conditions stored in memory 56. These threshold temperatures will be referred to as $T_A$, $T_B$ and $T_C$. $T_A$ is the lowest threshold temperature whereas $T_C$ is the highest. $T_B$ is a threshold temperature between $T_A$ and $T_C$.

Normally, the duct temperature sensed by the sensor 30 should be above the highest threshold temperature $T_C$. This will be the assumed initial temperature condition. Referring now to step 62, inquiry is first made as to whether the duct temperature $T_D$ is less than $T_A$. Since the duct temperature will be above $T_A$, the microprocessor will proceed to a step 64 and inquire as to whether the duct temperature $T_D$ is less than the threshold temperature $T_B$. Since the duct temperature will be above $T_B$, the microprocessor will proceed to a step 66 and clear a "TIME 1" flag. The microprocessor will next proceed to a step 68 and inquire as to whether the duct temperature is less than the threshold temperature $T_C$. Since the duct temperature will be above the highest threshold temperature $T_C$, the microprocessor will proceed along the no path to a step 70 and set a "PROCEED" flag in a step 70. The microprocessor will next clear a "DAMPER_OFFSET" variable in a step 72. Another variable "OLD$_{13}$ $T_D$" will be set equal to the threshold temperature $T_B$. The microprocessor next proceeds to clear a "LAT_TRIP" flag in a step 76. Following the setting of the various variables in steps 70 through 76, the microprocessor proceeds to a step 78 and inquires as to whether the cooling stage 32 of the two stage cooling system is on. If stage 32 has not been activated by the microprocessor 42, then an inquiry is made in a step 80 as to whether there is a demand for this cooling stage. This is essentially a check of the results of other programs that may have been run by the microprocessor 42 to ascertain whether there is a demand to activate this stage of cooling. Activation of this stage of cooling is subject to the setting of the "LAT_TRIP" flag. In this regard, the microprocessor proceeds from step 80 to a step 82 to inquire as to whether the "LAT_TRIP" flag has been set if a cooling demand has been noted in step 80. Since the "LAT_TRIP" flag was cleared in step 76, the microprocessor will proceed along the no path to a step 84 and turn on cooling stage 32. The microprocessor will next proceed to a step 86 and inquire as to whether a "REDUCE_STAGES" flag is set. It is to be appreciated that this flag will initially not be set when the process is first executed. The microprocessor will accordingly proceed from step 86 to a step 88 and set a zone index "i" equal to one. It is to be appreciated that the zone index is an identifier of the various temperature zones having remote room sensors 24, 26 and 28 and dampers 16, 18 and 20 associated therewith. The microprocessor will proceed to a step 90 and read the temperature "$T_i$" for the room sensor identified by the particular numerical value of the zone index. The microprocessor will thereafter fetch the set point for that particular identified zone in step 92. An inquiry will next be made in step 94 as to whether the thus read zone temperature is greater than the set point temperature for that particular zone. If the zone temperature is less than the zone set point temperature, the microprocessor will proceed to a step 96 and set the damper position for the particular zone $D_i$ equal to the value of DAMPER_OFFSET. Since DAMPER_OFFSET is initially cleared in step 72 this will mean that the damper for the particular zone will be closed since a cleared DAMPER OFFSET is zero. The microprocessor will proceed from step 96 to a step 98 and inquire as to whether the zone index, "i", equals "n". It is to be appreciated that "n" equals the total number of zones for a given configuration. Assuming another zone is to be checked, the microprocessor increments the zone index "i" in step 99 and returns to read the temperature $T_i$ and set point $S_i$ for the new zone index value. In the event that the zone temperature $T_i$ is above set point, the microprocessor proceeds to a step 100 and calculates a new damper position $D_i$ for the particular damper associated with the identified zone. This calculation will include multiplying a constant k times the temperature difference $T_i$ minus $S_i$ plus adding the damper offset value thereto. The constant k is the number of incremental positions per degree that the dampers 16, 18 and 20 are to move. The microprocessor proceeds to a step 102 and inquires as to whether the calculated damper position $D_i$ is greater than the maximum allowable position. The damper position is set equal to the maximum allowable in step 104 in the event that the calculated damper position is greater than the maximum allowable. The microprocessor proceeds to step 98 and inquires whether all zone indexes have been checked for temperatures and appropriate damper position calculations performed. When all zone indexes have been thus addressed, the microprocessor proceeds to a step 106 and exits the particular process of FIGS. 3A through 3C. It is to be appreciated that the microprocessor will preform other tasks before returning to the process of FIGS. 3A through 3C. The re-execution of the process of FIGS. 3A through 3C will preferably occur within a time period that allows for the process of FIGS. 3A through 3C to be re-executed in a timely manner. It is to be appreciated that this time may vary from system to system. Repeating the process every ten seconds is sufficient for the configuration of FIGS. 1 and 2.

Referring again to step 60, following the appropriate time interval, the microprocessor will again read the value $T_D$ of the sensor 30. For purposes of discussion, the duct temperature $T_D$ will be assumed to be less than the threshold temperature $T_C$ but greater than the threshold temperature $T_B$. This will prompt the microprocessor to proceed through steps 62, 64 and 66 to step 68. Since the duct temperature is less than the threshold temperature $T_C$, the microprocessor will proceed from step 68 to a step 108 and clear a "PROCEED" flag. The microprocessor will move from step 108 to step 78 and inquire as to whether the cooling stage 32 is on. Since the cooling stage 32 is now on, the microprocessor will proceed to a step 110 and inquire as to whether cooling stage 34 is on. Since cooling stage 34 is not yet on, the microprocessor will proceed to a step 112 and inquire as to whether a demand is present for cooling stage 34. This is a check as to whether another control process that has been run by the microprocessor 42 has demanded an activation of cooling stage 34. Assuming a demand to be present, the microprocessor will proceed to a step 114 and inquire as to whether the "PROCEED" flag has been set. It will be remembered that the "PROCEED" flag will have been cleared in step 108 since the duct temperature is now less than the threshold temperature $T_C$. Since the duct temperature is less than this threshold temperature, the microprocessor will proceed along the no path and not allow the cooling stage 34 to be activated. It is however to be appreciated that if the duct temperature were greater than the threshold temperature $T_C$, then the "PROCEED" flag would have been appropriately set in step 70 and the microprocessor would proceed from step 114 to a step 116 and turn on cooling stage 34.

The microprocessor proceeds from either step 114 along the no path or from step 116 to step 86 and inquires as to whether the "REDUCE_STAGES" flag is set. Since the "REDUCE_STAGES" flag has yet to be set, the microprocessor proceeds to step 88 and reads temperature and set points and updates any damper positions in steps 90 through 104 before exiting in step 106.

The microprocessor again executes other control processes before again returning to step 60 to read the temperature sensor 30. It will now be assumed that the duct temperature has dropped below the threshold temperature $T_B$. The microprocessor accordingly pursues the yes path out of step 64 and inquires in a step 118 as to whether the present duct temperature $T_D$ is greater than an old duct temperature value stored in the variable "OLD_$T_D$". It will be remembered that the value of the variable "OLD_$T_D$" is equal to the threshold temperature $T_B$ as result of step 74. Since the duct temperature will have dropped below this value of "OLD_$T_D$", the microprocessor will proceed along the no path from step 118 to a step 120 and inquire as to whether a "TIME_1" flag has been set. This particular flag will initially be clear when the microprocessor 42 is first powered up. This means that the microprocessor will proceed from step 120 to a step 122 and set this "TIME_1" flag. The microprocessor will proceed through the various steps that have been heretofore described and eventually exit from the process in step 106. The process of FIGS. 3A through 3C will again be executed in a timely fashion and the duct temperature $T_D$ will again be read in step 60. Assuming that the duct temperature remains below the threshold temperature $T_B$, the microprocessor will proceed along the yes path out of step 64 and along the no path out of step 118 to step 120. This time, the "TIME_1" flag will have been set prompting the microprocessor to proceed along the yes path out of step 122 a step 124 wherein the "REDUCE_STAGES" flag is set. The "TIME_1" flag is cleared in step 126 and the variable "OLD_$T_D$" is set equal to the current value of duct temperature in step 128. The microprocessor will next proceed to step 78 and again inquire as to whether the cooling stage 32 is on. In the event that stage 32 is on, the microprocessor will proceed to step 110 and inquire as to whether cooling stage 34 is also on. If the answer is yes, the microprocessor proceeds to a step 130 and inquires as to whether the "REDUCE_STAGES" flag has been set. Since "REDUCE_STAGES" flag was set in step 124, the microprocessor will proceed to a step 132 and turn off cooling stage 34. It is to be appreciated that this will only occur when the temperature drops below the threshold temperature $T_B$ causing the "TIME_1" flag to be set and thereby causing the microprocessor to completely execute the process of FIGS. 3A through 3C an other time before again returning to step 120.

Following deactivation of the cooling stage 34 in step 132, the microprocessor proceeds to step 134 and clears the "REDUCE_STAGES" flag. The microprocessor will again execute steps heretofore described and exit the process of FIGS. 3A through 3C in step 106.

Assuming the duct temperature, $T_D$, remains below the threshold temperature $T_B$ when the microprocessor again executes the control process of FIGS. 3A through 3C, the microprocessor will proceed along the yes path out of step 64 to step 118. Assuming that the duct temperature has furthermore dropped relative to its previous value stored in "OLD_$T_D$" the microprocessor will proceed along the no path out of step 118 and the no path out of step 120 so as to again set the "TIME_1" flag. Following the setting of the "TIME_1" flag, the microprocessor will proceed through the various steps as have been theretofore described and exit from the step 106.

Assuming the temperature remains below the threshold temperature $T_B$ and also drops relative to "OLD_$T_D$", the microprocessor will again execute the process of reading the duct temperature in step 60 and proceed through step 64 and through step 118 and proceed along the yes path out of step 120 to set the "REDUCE_STAGES" flag in step 124. The "TIME_1" flag will again be cleared in step 126 and the variable "OLD_$T_D$" will be set equal to the value of the current duct temperature in step 128. The microprocessor will proceed through steps 68 through 78 and along the yes path out of step 78 to step 110 wherein it will be noted that the cooling stage 34 has already been turned off. The no path will be pursued to a step 112 and inquiry will be made whether there is a demand for the cooling stage 34. If demand is present, the microprocessor proceeds to step 114 and inquires whether the "PROCEED" flag is set. It is to be appreciated that the only way the "PROCEED" flag would be set is if the temperature $T_D$ were equal to or above the threshold temperature $T_C$. The microprocessor will hence proceed along the no paths out of either step 112 or step 114 without turning the cooling stage 34 on. The microprocessor proceeds to step 86 and inquires as to whether the "REDUCE_STAGES" flag is set. Since the "REDUCE_STAGES" flag will have been set in step 124 as a result of the second time through of executing the process following the deactivation of the second cooling stage, the microprocessor will proceed to step 136 and first clear the "REDUCE_STAGES" flag. The microprocessor will proceed to step 138 and increment the current value of "DAMPER_OFFSET". The increment will preferably be one damper position. Inquiry is next made in step 140 as to whether the value of "DAMPER_OFFSET" is greater than a maximum allowable value. It is to be appreciated that the maximum allowable value for this variable can be any arbitrary number of incremental damper positions. This maximum value should be the amount that the damper is allowed to be opened to compensate for the denoted temperature condition that has prompted the damper offset calculation to be initiated. This maximum value could for instance be set equal to one half of the total incremental damper positions possible for any one of the dampers 16, 18 or 20. If this number is exceeded in step 140, the microprocessor proceeds to a step 142 and sets the "DAMPER OFFSET" variable equal to the maximum allowed value. The microprocessor either proceeds out of step 140 or step 142 with an appropriate offset damper value and proceeds to step 88 wherein the zone index "i" is set equal to one. The temperature for the zone indicated by the particular index setting "i" is compared with the set point temperature for that zone in step 94. If the temperature $T_i$ for the particular zone is below set point, then the damper position will be set equal to the calculated DAMPER OFFSET value in step 96. On the other hand, if the zone temperature $T_i$ is greater than set point, then the microprocessor will proceed to calculate the new damper position based on the noted temperature differential as well as adding the DAMPER_OFFSET value previously calculated. The microprocessor will proceed to inquire as to whether the damper position is at its maximum allowable open position and make the appropriate correction if necessary in step 104 before inquiring as to whether the last zone has been updated for damper position in step 98. When each zone has thus been updated, the microprocessor will exit the process in step 106.

It is to be appreciated that the "DAMPER_OFFSET" variable may be incremented every other time the process of FIGS. 3A through 3C is executed. This is of course due to the necessity of first setting the "TIME_1" flag and then subsequently setting the "REDUCE_STAGES" flag the next time through as long as "$T_D$" continues to drop relative to "OLD_$T_D$". Providing the above conditions continue, the microprocessor will proceed to calculate a new value for "DAMPER_OFFSET" in steps 138 through 142. In this manner, the value of DAMPER_OFFSET may potentially increment to the maximum allowable DAMPER_OFFSET value in an attempt to correct the declining temperature condition sensed by the temperature sensor 30. The thus opened dampers will allow more air to enter each zone than would otherwise be permitted by a normal damper control response to the room temperature versus the set point for that particular room. This damper opening should eventually alleviate the duct temperature condition occurring at the cooling coil 14.

If the duct temperature however continues to drop and more over drops below the threshold temperature $T_A$, then the microprocessor will so note this situation in step 62. The microprocessor will proceed from step 62 to a step 144 and turn off both cooling stages 32 and 34. After the cooling stages 32 and 34 have been turned off the microprocessor proceeds to a step 146 and sets a "LAT TRIP" flag in a step 146 before proceeding to the exit step 106.

It is to be appreciated that the process of FIGS. 3A through 3C will be executed repeatedly with no further action taken until the duct temperature rises about the threshold temperature $T_A$. At such time, the microprocessor will implement the various courses of action dictated by the duct temperature being first less and than greater than the threshold temperature $T_B$. If the air temperature finally rises above the threshold temperature $T_C$, the microprocessor will so note in step 68.

The "DAMPER OFFSET" will subsequently be cleared in step 72 and the "LAT_TRIP" flag will be cleared in step 76.

It is to be appreciated that the two stage cooling system and associated dampers will be allowed to operate in a normal fashion as long as the duct temperature downstream of the cooling coil remains greater than the threshold temperature $T_C$. At such temperatures, the microprocessor will be allowed to turn on the second cooling stage 34 in the event that it is not presently running. If the duct temperature again drops below the threshold temperature $T_B$, the microprocessor will deactivate the second stage of cooling one at a time following at least a second execution of the process due to the "TIME_1" flag setting routine. The microprocessor will also begin to open the dampers 16, 18 and 20 after having deactivated the second cooling stage in the event the sensed temperature downstream of the cooling coil continues to drop. If the temperature drops below threshold temperature $T_A$, then the microprocessor immediately deactivates both stages of cooling.

It is to be appreciated that a particular embodiment of the invention has been described. Alterations, modifications and improvements thereto will readily occur to those skilled in the art. Such alterations, modifications and improvements are intended to be part of this disclosure even though not expressly stated herein and are intended to be within the scope of the invention. Accordingly the foregoing description is by way of example only and the invention is to be limited only by the following claims and equivalents thereto.

What is claimed is:

1. A process for controlling the positioning of dampers within a variable air volume system in response to a sensing of the temperature of the air being supplied to the dampers, said process comprising the steps of:

sensing the current temperature of the air downstream of a cooling element which cools the air being supplied to the dampers;

comparing the sensed current temperature of the air to a first threshold temperature value;

comparing the sensed current temperature with a previously sensed temperature of the air when the sensed current temperature is less than the first threshold temperature value;

calculating an offset value that is to be used in adjusting the position of each damper when the sensed current temperature is less than the previously sensed temperature of the air; and adjusting the position to be commanded of each damper using the calculated offset value.

2. The process of claim 1 further comprising the step of:

repeating said steps of sensing current temperature, comparing the sensed temperature with a first threshold value and comparing the sensed current temperature with a previously sensed temperature before proceeding to said step of calculating an offset value.

3. The process of claim 2 further comprising the steps of:

storing the sensed current temperature as the previously sensed temperature after said step of comparing the sensed current temperature with a previously sensed temperature whereby the previously sensed temperature is the immediately previous sensed current temperature when said step of comparing the sensed current temperature with a previously sensed temperature is repeated.

4. The process of claim 3 further comprising the steps of:

repeating after said step of adjusting the position to be commanded of each damper, said steps of sensing the current temperature of the air downstream of the cooling element, comparing the sensed current temperature of the air to a first threshold temperature value; and comparing the sensed current temperature with the previously sensed temperature when the sensed temperature is below a previously sensed temperature;

incrementing the previously calculated offset value when the sensed temperature is below the previously sensed temperature; and checking whether the incremented offset value exceeds the maximum allowable offset value before proceeding to said step of adjusting the position to be commanded of each damper.

5. The process of claim 1 further comprising the steps of:

comparing the sensed current temperature with a second threshold temperature value which is greater than the first threshold temperature value; and clearing the calculated offset value when the sensed current temperature exceeds the second threshold temperature value.

6. The process of claim 1 wherein the cooling element has two separate stages of cooling attached thereto for chilling refrigerant passing through the cooling element and wherein said process includes the further step of:

checking whether the stages of cooling are on after said step of comparing the sensed temperature with a previously sensed temperature; and reducing the number of cooling stages if at least two stages of cooling are on; and repeating said steps of sensing current temperature, comparing the sensed temperature with a first threshold value and comparing the sensed current temperature with a previously sensed temperature before proceeding to said step of calculating an offset value.

7. The process of claim 6 further comprising the steps of:

comparing the sensed current temperature with a second threshold temperature which is less than the first threshold temperature;

turning off all stages of cooling if the sensed current temperature is less than the second threshold temperature.

8. The process of claim 7 further comprising the steps of:

comparing the sensed current temperature with a third threshold temperature value which is greater than the first threshold temperature value; and clearing the calculated offset value when the sensed current temperature exceeds the third threshold temperature value.

9. The process of claim 8 further comprising the step of:

allowing cooling stages to be turned on again when the sensed current temperature exceeds the third threshold temperature value.

10. The process of claim 1 wherein said step of adjusting the position to be commanded of each damper comprises the steps of:

sensing the temperature of each space to be cooled by the air flowing through a damper associated with the space;

comparing the sensed temperature of each space with a set point temperature for the space; and setting the commanded position of the damper associated with each space equal to the calculated offset value when the sensed temperature is less than the set point temperature for the space.

11. The process of claim 10 wherein said step of adjusting the position to be commanded of each damper further comprises the step of:

calculating a damper position value based on the difference between the sensed temperature of a space and the set point temperature of the space when the sensed temperature is greater than the set point temperature for the space; and setting the commanded position of the damper associated with the space equal to the calculated damper position plus the offset value when the sensed temperature of the space is greater than the set point temperature for the space.

12. A system for controlling the positioning of dampers within a variable air volume system having a cooling element for cooling the air being supplied to the dampers, said system comprising:

a plurality of motors, each motor associated with a respective damper;

drive circuitry associated with each motor for providing current to the drive motors so as to position the dampers;

a sensor located downstream of the cooling element and upstream of the dampers so as to measure the temperature of the air leaving the cooling element;

a processing unit connected through an interface to said sensor and furthermore being connected to said drive circuitry, said processor having a memory unit associated therewith; said memory unit including a stored program executable by said processing unit, said stored program including an instruction for comparing a temperature sensed by said sensor with a first threshold temperature value, an instruction for comparing the sensed current temperature with a previously sensed temperature, an instruction for calculating an offset value that is to be used by said motor driver circuitry and said motors to adjust the position of each damper when the sensed temperature is less than a previous temperature sensed by said sensor.

13. The system of claim 12 wherein said memory unit further includes:

an instruction for comparing the current temperature sensed by said sensor with a second threshold temperature value; and an instruction for clearing the calculated offset value when the current temperature sensed by said sensor exceeds the second threshold temperature value.

14. The system of claim 12 wherein said cooling element includes at least two stages of cooling for chilling refrigerant flowing through the cooling element and wherein said memory unit includes:

an instruction for checking whether two or more stages of cooling are on when said instruction for comparing sensed temperature with a previously sensed temperature indicates the sensed temperature is less than the previously sensed temperature; and an instruction for reducing the number of cooling stages if at least two cooling stages are on when the sensed temperature is less than the previously sensed temperature.

15. The system of claim 14 wherein said memory unit further includes:

an instruction for comparing the sensed temperature with a second threshold temperature which is less than the first threshold temperature; and turning off all stages of cooling if the current temperature sensed by said sensor is less than the second threshold temperature.

16. The system of claim 14 wherein said memory unit further includes:

an instruction for comparing the sensed current temperature with a third threshold temperature which is greater than the first threshold value; and an instruction for clearing the calculated offset value when the current temperature sensed by said sensor exceeds the third threshold temperature value.

* * * * *